Sept. 21, 1954    S. C. ROCKAFELLOW    2,689,929
ELECTRONIC SEQUENCE CONTROL DEVICE
Filed July 31, 1951
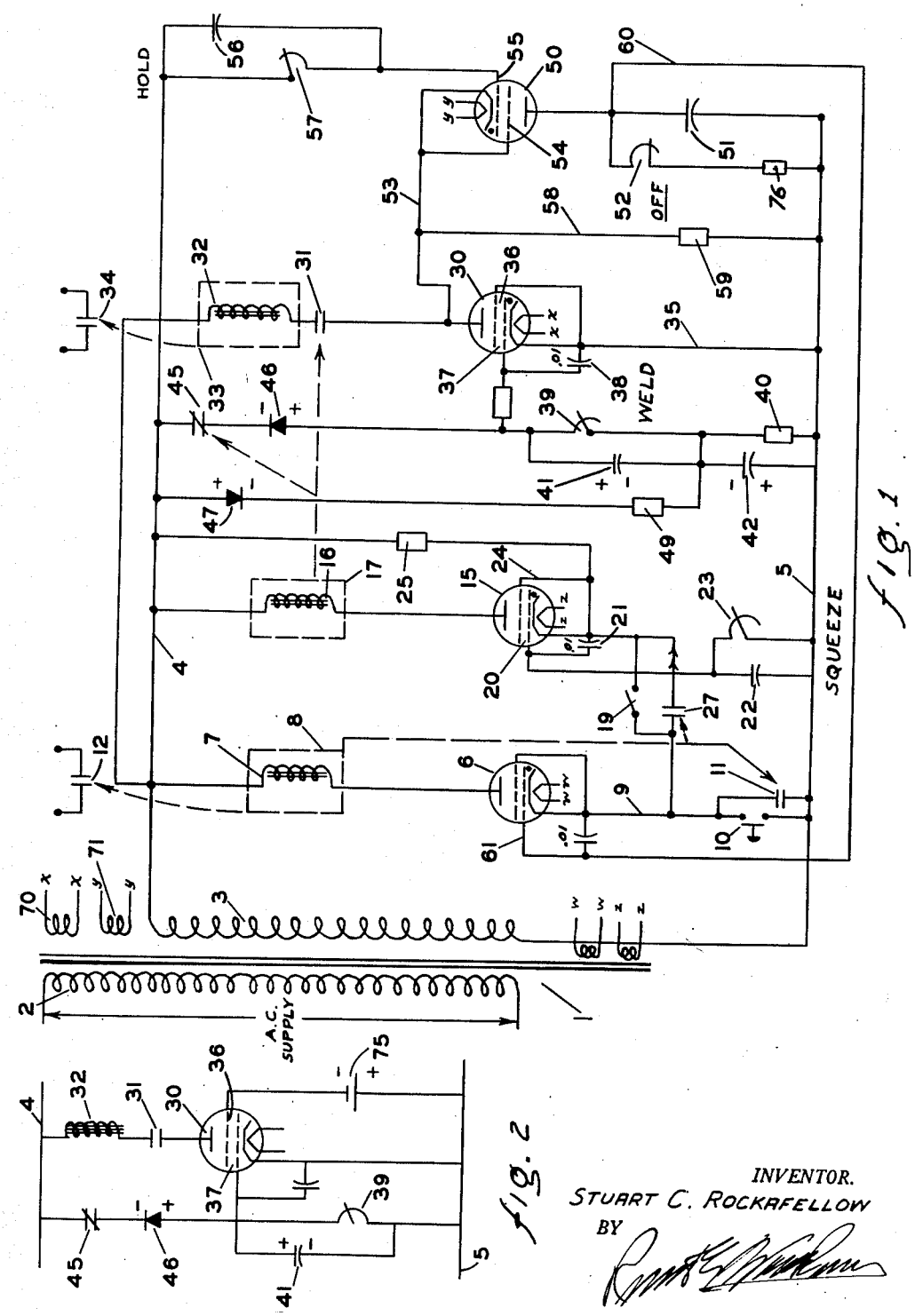
INVENTOR.
STUART C. ROCKAFELLOW
BY Patented Sept. 21, 1954

2,689,929

UNITED STATES PATENT OFFICE 2,689,929

ELECTRONIC SEQUENCE CONTROL DEVICE

Stuart C. Rockafellow, Farmington, Mich., assignor to Robotron Corporation, Detroit, Mich., a corporation of Michigan Application July 31, 1951, Serial No. 239,593

22 Claims. (Cl. 315—252)

This invention relates to an electronic sequence control device and particularly to a type thereof adapted for controlling electric welding machines utilizing the functions of "squeeze," "weld," "hold," and "off."

Present timers of this general nature may be provided with relays for certain phases of the sequencing functions, or they may be provided with an electric discharge device, as a thyratron, wherein the conduction of said thyratron is utilized to shut off the welding function. In many instances, this means that where the tube or relay whose actuation is necessary to terminate the welding function fails to operate properly, the welding function may not be terminated but instead may continue indefinitely. The disadvantages of this occurrence are well recognized in the industry.

Further, in present timers of this general type, the cost of replacing tubes sometimes assumes major proportions, particularly where the welding machines involved are subjected to continuous, or substantially continuous, operation. Therefore, it is desirable to provide a sequencing control timer for such a welding machine wherein the number of tubes required is reduced from that required in previously utilized timers for similar purposes.

Accordingly, a principal object of the invention is to provide a circuit capable of controlling the normal functions of "squeeze," "weld," "hold" and "off" and in which the circuitry is so arranged that upon the failure of any tube, the welding function will either not start at all, or if already started, it will terminate at or before its normal time of termination, and thus will not scorch the metal, and it will not again start.

A further object of the invention is to provide a circuit, as aforesaid, which will utilize a minimum number of tubes.

A further object of the invention is to provide a device of the nature aforesaid which will be simple and economical to construct and which will have low maintenance requirements.

A further object of the invention is to provide a sequencing device, as aforesaid, which will be accurate and reliable in its operation.

Other objects and purposes of the invention will be apparent to persons acquainted with apparatus of this general type upon reading of the following disclosure and inspection of the accompanying drawing.

In the accompanying drawing:

Figure 1 shows an elementary circuit diagram of a preferred embodiment of my invention.

Figure 2 shows a fragmentary portion of the circuit illustrating a modification of the invention.

Description

An iron core transformer 1 has its primary winding 2 energized by any conventional alternating current source and thereby energizes its secondary winding 3 in a conventional manner. Said secondary winding then energizes the bus conductors 4 and 5 for purposes appearing hereinafter.

Arranged between said bus conductors are a plurality of gas filled electric discharge devices, as thyratrons, of the discontinuous type having principal electrodes and one or more control electrodes. Electric discharge devices of this type have the well known characteristic that the control electrode will control the commencement of conduction in said device, but when conduction is once started said control electrode then loses all influence and conduction continues regardless of said control electrode for so long as a predetermined potential remains between the principal electrodes.

The discharge device 6 is connected by its anode through the winding 7 of a relay 8 to the bus conductor 4. Said discharge device is connected by its cathode to a conductor 9 and through the normally open switch 10 to the bus conductor 5. The contacts 11 of the relay 8 are shunted around the switch 10 and the contacts 12 of the relay 8 are connected in any conventional manner to means for closing the electrodes of the welding machine.

The discharge device 15 is connected by its anode through the winding 16 of the relay 17 to the bus conductor 4. Said tube is also connected by its cathode through a switch 19 to the conductor 9 between the switch 10 and the cathode of the thyratron 6.

The normally opened contacts 27 of the relay 8 are connected around the switch 19 for purposes appearing hereinafter. The control electrode 20 of said thyratron 15 is connected to the cathode thereof through the small capacitor 21 and is also connected to the bus conductor 5 through the time-constant circuit comprising the capacitor 22 and the resistor 23, said resistor being preferably of an adjustable type. The screen grid 24 is connected to the cathode of said thyratron 15 and said cathode is connected through a suitable resistor 25 to the bus conductor 4. Said resistor 25 is of relatively high value, as of the order of 51 megohms.

The thyratron 30 is connected by its anode through a normally open switch controlled from the anode circuit of thyratron 15, as the contacts 31 of the relay 17 and thence through the winding 32 of the relay 33 to the bus conductor 4. Said relay 33 has contacts 34 which control the welding current by any conventional means. The cathode of said thyratron 30 is connected by a conductor 35 to the bus conductor 5. The screen grid 36 is connected in conventional manner to the cathode of said thyratron 30.

The control electrode 37 is connected through the small capacitor 38 to the cathode of the thyraton 30, and is also connected through the adjustable resistor 39 to another resistor 40, which may be fixed or adjustable, and through same to the bus conductor 5. A capacitor 41 shunts the resistor 39 and a capacitor 42 shunts the resistor 40. A normally closed switch controlled from the anode circuit of the thyratron 15, as a pair of normally closed contacts 45 of the relay 17, is connected to the bus conductor 4 and thence connect through the rectifier 46 to a point between the control electrode 37 and the resistor 39. The said rectifier 46 is arranged in such sense that the negative side thereof is connected to the bus conductor 4.

A further rectifier 47 is connected to the bus conductor 4 in opposite polarity with respect to the rectifier 46 and is thence connected to a point intermediate said resistance 39 and said resistance 40. A resistance 49 is imposed into said last named connection.

The thyratron 50 is connected by its anode to the bus conductor 5 through a time-constant circuit comprising the capacitor 51 and the resistance 52, which resistance is preferably of adjustable value and a limiting resistor 76. Said limiting resistor is in series with the resistance 52, and is of high value, as 50,000 ohms. The cathode of said thyratron 50 is connected to the anode of the thyratron 30 at a point between said thyratron and the contacts 31 of the relay 17. The screen grid 54 is connected to the cathode of the said thyratron 50 and the control electrode 55 is connected through a time-constant circuit comprising the capacitor 56 and the resistor 57 to the bus conductor 4. A conductor 58, including the resistor 59, connects the conductor 53 to the bus conductor 5, said resistor 59 being of relatively high resistive value, such as, by way of example, of the order of 100 megohms. The anode of said thyratron 50 is connected by the conductor 60 to the control electrode 61 of the thyratron 6.

The filaments of all the tubes are connected in a conventional manner to the windings 70, 71, 72 and 73 of the transformer 1, the filaments being connected as indicated by corresponding letters "x—x," "y—y," "w—w" and "z—z."

Operation

Upon energization of the primary winding 2 of the transformer 1, the bus conductors 4 and 5 become energized in a well known manner. This creates the following condition in the system:

The thyratron 6 is non-conductive due to the open switch 10 in its cathode circuit. The thyratron 15 is likewise non-conductive inasmuch as the open switch 10 is in its cathode circuit also. The thyratron 30 is non-conductive due to the open relay contacts 31 in its anode circuit. The thyratron 50 is non-conductive inasmuch as the open relay contacts 31 are in its cathode circuit.

The capacitor 22 is charged by electron flow from the bus conductor 4 through the resistor 25 and thence from the cathode of the thyratron 15 to the control electrode 20 thereof and on through the resistor 23 to bus conductor 5. This charges the capacitor 22. A further electron flow from the bus conductor 5 through the resistances 40 and 39, under the control of the rectifier 46, charges the capacitor 41, with the positive potential on the side thereof connected to the control electrode 37.

A flow of electrons also occurs from the bus conductor 4 through the rectifier 47 and the resistors 49 and 40 to the bus conductor 5, thereby charging the capacitor 42, the polarity of such charging being such that the negative side thereof is that side connected to the capacitor 41. The resistances of these several resistors are so chosen that in the at-rest condition now being described, a positive potential is imposed on the control electrode 37 sufficient that upon closing of the relay contacts 31 the thyratron 30 will immediately conduct.

A further flow of electrons occurs from the bus conductor 5 through the resistor 59 and the cathode of the thyratron 50 to the control electrode 55 thereof and thence through the resistor 57 to the bus conductor 4. This charges the capacitor 56.

With the manual closing of the switch 10 a sequence is commenced. By the closing of said switch, conduction through the thyratron 6 is effected and this energizes the relay 8, which energization closes the normally open contacts 11, 12 and 27. The function of switch 19 will appear hereinafter. The closing of the contact 11 holds the thyratron 6 continuously conductive and locks the relay 8 in energized position, which also provides a cathode supply through the contacts 27 for the thyratron 15. This brings the cathode of thyratron 15 to the potential of the bus conductor 5 and thus removes the formerly existing charging potential through the cathode-to-grid conduction in said thyratron 15. However, the thyratron 15 remains blocked due to the high negative potential on its control electrode 20 and it remains blocked until the capacitor 22 drains through the resistor 23 sufficiently to cause the negative charge on said control electrode to become reduced sufficiently to permit conduction to occur. This constitutes the "squeeze" time.

Conduction of the thyratron 15 energizes the relay 17 and thereby opens the normally closed contacts 45 and closes the normally open contacts 31.

Opening of the contacts 45 terminates the charging of the capacitor 41 and it immediately commences to discharge through the resistor 39. Closing of the normally open contacts 31 permits immediate conduction by the thyratron 30 and thereby effects energization of the relay 33 which closes the contacts 34 and commences the flow of the welding current.

As soon as the capacitor 41 drains through the resistor 39 sufficiently to enable the negative charge on the side of the capacitor 42 connected to the capacitor 41 to overcome the charge on capacitor 41, said negative charge on the capacitor 42 will be imposed onto the control electrode 37 and the tube will again be rendered non-conductive. This will terminate the flow of welding current and the time required so to drain capacitor 41 constitutes the "weld" time.

Simultaneously with the termination of conduction through the thyratron 30, at which time the conductor 53 becomes at bus conductor 4 potential due to the lack of voltage drop in the winding 32 and with the contacts 31 remaining closed, the potential at the cathode of thyratron 50 reverses and thus removes the charging potential for the capacitor 56. This capacitor then commences to drain through the resistor 57 but holds the thyratron 50 blocked by the high negative potential on the control electrode 55 until said capacitor drains down to a predetermined value. This constitutes the "hold" time.

When such draining is completed, the thyratron 50 conducts and thereby charges the capacitor 51 and simultaneously places a negative potential by the conductor 60 onto the control electrode 61 of the thyratron 6. This blocks the thyratron 6 and de-energizes the relay 8. De-energization of said relay permits the electrodes to open and simultaneously opens the contacts 11 and 27. The value of the resistor 76 is sufficient that conduction of the thyratron 50 will not again energize the relay 33.

If the switch 19 has been set for single operation it will be closed and it will thereby shunt the contacts 27. Thus, assuming the switch 10 remains manually closed (for if it were then open the entire apparatus would then go into its "at rest" position anyway) the thyratron 15 remains conductive and the relay 17 remains energized. This holds the contacts 31 closed and holds the cathode of the thyratron 50 at the bus conductor 4 potential. This permits continued conduction through the thyratron 50 and continued blocking of the thyratron 6, whereby the electrodes remain open and a new cycle cannot be started.

However, assuming a repeat operation is desired, the switch 19 will be open and upon the opening of the contacts 11 and 27, with the switch 10 continuing to be held closed manually, a cathode supply is continued to be provided with respect to the thyratron 6 but not with respect to the thyratron 15. The thyratron 6, however, will not be conductive for so long as a potential remains on its control electrode 61.

Terminating the cathode supply to the thyratron 15 by the opening of contacts 27 permits de-energization of the relay 17 and consequent closing of the contacts 45 and opening of the contacts 31. Cathode-to-grid conduction again commences in the thyratron 15 and the capacitor 22 is again charged. Closing of the contacts 45 permits conduction through the resistor 39 to resume and the capacitor 41 again becomes charged. Opening of the contacts 31 removes the cathode supply for the thyratron 50 and the thyratron 50 ceases to conduct. This permits the charge on the capacitor 51 to drain through the resistor 52 and, since this determines the time in which the blocking potential is held on the thyratron 6, this constitutes the "off" time.

Thus, as soon as the capacitor 51 has drained sufficiently to terminate the blocking of thyratron 6, conduction will again take place in said thyratron 6 and a new cycle is commenced.

In the event that any one of the tubes fails prior to the commencement of a weld sequence, it will be observed that the welding sequence will be prevented from starting. For example, if thyratron 6 fails, the relay 8 will become de-energized and the welding electrodes will open. If thyratron 15 fails, the relay 17 will become de-energized and the contacts 31 will open, thereby preventing energization of the relay 33 and thus preventing the closing of the welding current contacts 34. If the thyratron 30 fails, the relay 33 will not be energized. If the thyratron 50 fails, no blocking of the thyratron 6 will be effected and the thyratron 6 will thereby remain conductive, the relay 8 will thereby remain energized to hold the contacts 12 closed and thus hold the electrodes against opening. At the same time the thyratron 15 will remain conductive and thus hold the relay 17 energized, which will keep the contacts 45 open and thereby prevent recharging of the capacitor 41. This permits the negative potential on the capacitor 42 to remain on the control electrode 37 and thereby continue to hold the thyratron 30 in a blocked condition, which prevents energizing of the relay 33 and thereby prevents closing of the weld current contacts 34.

In the event that a tube fails while a welding cycle is in progress the sequence will in some cases be finished out but not repeated and in other cases the welding current will be immediately terminated and will not be reinitiated. This will be self evident in the light of the preceding analysis and hence further explanation is unnecessary.

Referring now to Figure 2 there is shown a portion of a modified structure wherein, excepting as hereinafter stated otherwise, all of the parts are the same as the preferred structure illustrated in Figure 1. In this form, the constant potential is applied to a second grid in the thyratron 30 rather than imposing said potential onto the same grid as the variable potential. In the figure, the resistance 39 is connected directly to the bus conductor 5 rather than being connected thereto through another resistance. The capacitor 41 and resistor 39 are connected through the switch 45 and the rectifier 46 the same as in the embodiment shown in Figure 1 to provide the variable potential, but the constant potential, equivalent to that which in Figure 1 appears on the capacitor 42, here originates in a battery 75 and is imposed onto the electrode 36 which now becomes a second control electrode. The general mode of operation of the modified device is the same as that above described with respect to Figure 1.

While my invention is herein illustrated by reference to certain specific embodiments thereof, it will be recognized that several modifications may be made in its narrower concepts without departing from the broad scope of the invention and hence the hereinafter appended claims are to be liberally construed excepting as they by their own express terms require otherwise.

I claim:

1. In an electrical timing network, the combination comprising: first and second terminals constituting a source of alternating potential; a thyratron having its cathode connected to the first of said terminals and its anode connected to the second of said terminals; first and a second resistors and means connecting same in a series group; a rectifier and a switch and means connecting said rectifier and said switch in series and means connecting one end of said series group to said first terminal and means connecting the other end of said series group through said rectifier and said switch to said second terminal, said rectifier being so positioned that its negative side is connected to said second terminal; means connecting the control electrode of said thyratron to a point intermediate said second terminal and said resistors, first and second capacitors and means connecting each of them in shunt respectively around each of said resistors; a second rectifier and a resistance and means connecting same in series group with each other and connecting one end of said series group to said second terminal and connecting the other end of said series group to a point between said first and second resistors, said second rectifier having its positive side connected to said second terminal; whereby when said switch is closed both of said capacitors will become charged and said thyratron will be conductive and when said switch is open said thyratron will remain conductive for a predeterminable time and then will become non-conductive.

2. In the electrical timing network, the combination comprising: first and second terminals constituting a source of alternating potential; a thyratron having its cathode connected to the first of said terminals and its anode connected to the second of said terminals; first and second resistors and means connecting same in a series group; a rectifier and a switch and means connecting said rectifier and said switch in series and means connecting one end of said series group to said first terminal and means connecting the other end of said series group through said rectifier and said switch to said second terminal, said rectifier being so positioned that its negative side is connected to said second terminal; means connecting the control electrode of said thyratron to a point intermediate said second terminal and said resistors; first and second capacitors and means connecting each of them in shunt respectively around each of said resistors; means constantly charging the capacitor remote from said control electrode to a potential opposite to that imposed upon the capacitor adjacent said control electrode; whereby when said switch is closed both of said capacitors will become charged and said thyratron will be conductive and when said switch is open said thyratron will remain conductive for a predeterminable time and then will become non-conductive.

3. In an electrical timing network, the combination comprising: first and second terminals constituting a source of alternating potential; a thyratron having its cathode connected to the first of said terminals and its anode connected to the second of said terminals; a resistor; a rectifier and a switch and means connecting said rectifier and said switch in series; means connecting one end of said resistor to said first terminal and means connecting the other end of said resistor through said rectifier and said switch to said second terminal, said rectifier being so positioned that its negative side is connected to said second terminal; means connecting the control electrode of said thyratron intermediate said second terminal and said resistor; a capacitor and means connecting same in shunt around said resistor; means imposing a constant negative potential onto said control electrode; whereby when said switch is closed said thyratron will be conductive and when said switch is open said thyratron will remain conductive for a predeterminable time and then will become non-conductive.

4. In an electrical timing network, the combination comprising: first and second terminals constituting a source of alternating potential; a thyratron having its cathode connected to the first of said terminals and its anode connected to the second of said terminals; a resistor; a rectifier and a switch and means connecting said rectifier and said switch in series; means connecting one end of said resistor to said first terminal and means connecting the other end of said resistor through said rectifier and said switch to said second terminal, said rectifier being so positioned that its negative side is connected to said second terminal; means connecting the control electrode of said thyratron intermediate said second terminal and said resistor; means introducing a constant negative potential into the discharge space between the principal electrodes of said thyratron; a capacitor and means connecting same in shunt around said resistor; said negative potential being of value sufficient to block said thyratron but less than the positive potential placed on said control electrode by said capacitor when same is charged and said switch is closed; whereby when said switch is closed said thyratron will be conductive and when said switch is open said thyratron will remain conductive for a predeterminable time and then will become non-conductive.

5. In an electrical timing network, the combination comprising: first and second terminals constituting a source of alternating potential; a thyratron having first and second control electrodes and having its cathode connected to the first of said terminals and its anode connected to the second of said terminals; a resistor; a rectifier and a switch and means connecting said rectifier and said switch in series; means connecting one end of said resistor to said first terminal and means connecting the other end of said resistor through said rectifier and said switch to said second terminal, said rectifier being so positioned that its negative side is connected to said second terminal; means connecting the first control electrode of said thyratron intermediate said second terminal and said resistor; means introducing a constant negative potential onto said second control electrode; a capacitor and means connecting same in shunt around said resistor; said negative potential being of value sufficient to block said thyratron but less than the positive potential placed on said first control electrode by said capacitor when same is charged and said switch is closed; whereby when said switch is closed said thyratron will be conductive and when said switch is open said thyratron will remain conductive for a predeterminable time and then will become non-conductive.

6. In an electric sequence control circuit, the combination comprising: a pair of terminals providing a source of alternating potential; a thyratron; means including a first time-constant circuit connecting the anode of said thyratron to the first of said terminals; means including a second time-constant circuit connecting a control electrode of said thyratron to the second of said terminals; means including a switch and a relatively low resistance connecting the cathode of said thyratron to the second of said terminals and other means including a relatively high resistance connecting said cathode to the first of said terminals.

7. The device defined in claim 6 including a further thyratron, and means connecting the anode thereof to said second terminal and means connecting the cathode thereof to said first terminal and means connecting the anode of said first named thyratron to the control electrode of said second named thyratron.

8. In an electric sequence control circuit, the combination comprising: a pair of terminals providing a source of alternating potential; a thyratron; means including a resistor and a capacitor in parallel with each other connecting the anode of said thyratron to the first of said terminals; means including a second resistor and a second capacitor in parallel with each other connecting a control electrode of said thyratron to the second of said terminals; means including a switch and a relatively low resistance connecting the cathode of said thyratron to the second of said terminals and other means including a relatively high resistance connecting said cathode to the first of said terminals.

9. In an electrical timing device, the combination comprising: first and second terminals providing a source of alternating potential; a first thyratron and means connecting the cathode thereof to said first terminal; means including a load of relatively low resistance and a switch connecting the anode of said first thyratron to said second terminal; means including a time-constant circuit and a normally closed switch, normally imposing a positive potential onto the control electrode of said first thyratron; means imposing a constant negative potential onto said control electrode, said negative potential being of less value than said positive potential; a second thyratron and means including a second time-constant circuit connecting the anode thereof to the first terminal; means including a third time-constant circuit connecting the control electrode of said second thyratron to the second terminal, and means connecting the cathode thereof to the anode of said first named thyratron; means including a resistance of relatively great value connecting said last named cathode to said first terminal.

10. In an electrical timing device, the combination comprising: first and second terminals providing a source of alternating potential; a first thyratron and means connecting the cathode thereof to said first terminal; means including a load of relatively low resistance and a switch connecting the anode of said first thyratron to said second terminal; means including a time-constant circuit and a normally closed switch, normally imposing a positive potential onto the control electrode of said first thyratron; means causing a constant negative potential to oppose said positive potential, said negative potential being of less value than said positive potential; a second thyratron and means including a second time-constant circuit connecting the control electrode of said second thyratron to the second terminal, and means connecting the cathode thereof to the anode of said first named thyratron; means including a resistance of relatively great value connecting said last named cathode to said first terminal, and a conductor connecting the anode of said second thyratron to said first terminal.

11. In an electrical timing device, the combination comprising: first and second terminals providing a source of alternating potential; a first thyratron and means connecting the cathode thereof to said first terminal and means including the winding of a relay and a switch connecting the anode of said first thyratron to said second terminal; circuitry imposing a controllable bias onto the control electrode of said first thyratron; a second thyratron and means including a first time-constant circuit connecting the anode thereof to the first terminal; means including a second time-constant circuit connecting the control electrode of said second thyratron to the second terminal, and means connecting the cathode of said second thyratron to the anode of said first thyratron; means including a resistance of relatively great value connecting said last-named cathode to said first terminal.

12. In an electric timing circuit for an electric welding machine the combination comprising: first and second bus conductors; a first thyratron and means including a switch connecting the cathode thereof to said first bus conductor; a first relay having first and second pairs of contacts and means including the winding thereof connecting the anode of said first thyratron to said second bus conductor, the first pair of contacts of said first relay adapted for controlling the opening and closing of welding electrodes; a second thyratron and means including the second pair of contacts of said first relay and said switch in series with respect to each other connecting the cathode thereof to said first bus conductor; a second relay having a normally open first and normally closed second pairs of contacts and means including the winding thereof connecting the anode of said second thyratron to said second bus conductor; means including a first time-constant circuit connecting the control electrode of said second thyratron to said first bus conductor; a third thyratron and means connecting the cathode thereof to said first bus conductor and means including a load of relatively low resistance and the first pair of contacts of said second relay connecting the anode of said third thyratron to second bus conductor; means including a second time-constant circuit and the normally closed second pair of contacts of said second relay normally imposing a constant positive potential onto the control electrode of said third thyratron; a fourth thyratron and means including a third time-constant circuit connecting the anode thereof to said first bus conductor and means including a fourth time-constant circuit connecting the control electrode of said fourth thyratron to said second bus conductor, and means connecting the cathode of said fourth thyratron to the anode of the said third thyratron; means including a resistance of relatively great value connecting said last-named cathode to said first bus conductor.

13. In an electric timing circuit for an electric welding machine the combination comprising: first and second bus conductors; a first thyratron and means including a switch connecting the cathode thereof to said first bus conductor; a first relay having first and second pairs of contacts and means including the winding thereof connecting the anode of said first thyratron to said second bus conductor, the first pair of contacts of said first relay adapted for controlling the opening and closing of welding electrodes; a second thyratron and means including the second pair of contacts of said first relay and said switch in series with respect to each other connecting the cathode thereto to said first bus conductor; a second relay having normally open first and normally closed second pairs of contacts and means including the winding thereof connecting the anode of said second thyratron to said second bus conductor; means including a first time-constant circuit connecting the control electrode of said second thyratron to said first bus conductor; a third thyratron having its cathode connected to said first bus conductor; a load of relatively low resistance and the first pair of contacts of said second relay connecting the anode of said third thyratron to said second bus conductor; first and second resistors and means connecting same in series group; a first rectifier and means connecting said first rectifier and the second pair of contacts of said second relay in series and means connecting one end of said series group to said first bus conductor and means connecting the other end of said series group through said rectifier and said last-named contacts to said second bus conductor, said rectifier being so positioned that its negative side is connected to said second bus conductor; means connecting the control electrode of said thyratron to a point intermediate said second bus conductor and said resistors; first and second capacitors and means connecting each of them in shunt respectively around each of said resistors; a second rectifier and a resistance and means connecting same in a series group with each other and connecting one end of said series group to said second bus conductor and connecting the other end of said series group to a point between said first and second resistors, said second rectifier having its positive side connected to said second bus conductor; a fourth thyratron; means including a second time-constant circuit connecting the anode of said fourth thyratron to said bus conductor; means including a third time-constant circuit connecting a control electrode of said fourth thyratron to said second bus conductor; means connecting the cathode of said fourth thyratron to the anode of said third thyratron and other means including a relatively high resistance connecting said last-named cathode to said first bus conductor.

14. The device defined in claim 13 including a connection from the anode of said fourth thyratron to the control electrode in said first thyratron.

15. In an electric timing circuit for controlling a sequence of operations, the combination comprising: first and second bus conductors; a first thyratron and means including an electrically controllable switch connecting the cathode thereof to said first bus conductor; a relay having normally opened first and normally closed second pairs of contacts and means including the winding thereof connecting the anode of said first thyratron with said second bus conductor; means including a first time constant circuit connecting the control electrode of said first thyratron to said first bus conductor; a second thyratron having its cathode connected to said first bus conductor; a load of relative low resistance and the first pair of contacts of said relay connecting the anode of said second thyratron to said second bus conductor; first and second resistors and means connecting same in series group; a first rectifier and means connecting said first rectifier and the second pair of contacts of said relay in series and means connecting one end of said series group to said first bus conductor and means connecting the other end of said series group through said rectifier and said last named contacts to said second bus conductor, said rectifier being so positioned that its negative side is connected to said second bus conductor; means connecting the control electrode of said thyratron to a point intermediate said second bus conductor and said resistors; first and second capacitors and means connecting each of them in shunt respectively around each of said resistors; a second rectifier and a resistance and means connecting same in a series group with each other and connecting one end of said series group to said second bus conductor and connecting the other end of said series group to a point between said first and second resistors, said second rectifier having its positive side connected to said second bus conductor; a third thyratron; means including a second time-constant circuit connecting the anode of said third thyratron to said first bus conductor; means including a third time-constant circuit connecting a control electrode of said third thyratron to said second bus conductor; means connecting the cathode of said third thyratron to the anode of said second thyratron and other means including a relatively high resistance connecting said cathode to said first bus conductor and further means connected to the anode of said third thyratron for rendering said electrically controllable switch conductive and non-conductive.

16. In an electric timing circuit for controlling a sequence of operations, the combination comprising: first and second bus conductors; a first thyratron and means including an electrically controllable switch connecting the cathode thereof to said first bus conductor; a relay having normally opened first and normally closed second pairs of contacts and means including the winding thereof connecting the anode of said first thyratron with said second bus conductor; means including a first time constant circuit connecting the control electrode of said first thyratron to said first bus conductor; a second thyratron having its cathode connected to said first bus conductor; means including the first pair of contacts of said relay and a serially connected load of relative low resistance connecting the anode of said second thyratron to said second bus conductor; means including a first time constant circuit connecting the control electrode of said second thyratron to said first bus conductor; means including said time constant circuit and the normally closed second pair of contacts of said relay normally imposing a substantially constant positive potential onto the control electrode of said second thyratron; a source of substantially constant negative potential and a circuit applying same to the control electrode of the second thyratron; a third thyratron and means including a second time constant circuit connecting the anode thereof to said first bus conductor and means including a third time constant circuit connecting the control electrode of said third thyratron to said second bus conductor, and means connecting the cathode of said third thyratron to the anode of the said second thyratron; means including a resistance of relatively great value connecting said last named cathode to said first bus conductor and means responsive to energization and deenergization of the anode of the third thyratron for rendering said electrically controllable switch conductive and non-conductive.

17. In an electric timing circuit for an electric welding machine the combination comprising: first and second bus conductors; a first thyratron and means including a switch connecting the cathode thereof to said first bus conductor; a first relay having first and second pairs of contacts and means including the winding thereof connecting the anode of said first thyratron to said second bus conductor, the first pair of contacts of said first relay adapted for controlling the opening and closing of welding electrodes; a second thyratron and means including the second pair of contacts of said first relay and said switch in series with respect to each other connecting the cathode thereof to said first bus conductor; a second relay having a normally open first and normally closed second pairs of contacts and means including the winding thereof connecting the anode of said second thyratron to said second bus conductor; means including a first time constant circuit connecting the control electrode of said second thyratron to said first bus conductor;

a third thyratron and means connecting the cathode thereof to said first bus conductor and means including a load of relatively low resistance and the first pair of contacts of said second relay connecting the anode of said third thyratron to second bus conductor; means including a second time-constant circuit and the normally closed second pair of contacts of said second relay normally imposing a substantially constant positive potential onto the control electrode of said third thyratron; and means causing a constant negative potential to oppose said positive potential, said negative potential being of less value than the normal value of said positive potential.

18. In an electric timing circuit for controlling a sequence of operations, the combination comprising: first and second bus conductors; a first thyratron and means including an electrically controllable switch connecting the cathode thereof to said first bus conductor; a relay having normally opened first and normally closed second pairs of contacts and means including the winding thereof connecting the anode of said first thyratron with said second bus conductor; means including a first time constant circuit connecting the control electrode of said first thyratron to said first bus conductor; a second thyratron having its cathode connected to said first bus conductor; means including a serially connected load of relatively low resistance and the first pair of contacts of said relay connecting the anode of said second thyratron to said second bus conductor; means including a second time constant circuit connecting the control electrode of said second thyratron to said first bus conductor; means including a third time constant circuit and the normally closed second pair of contacts of said second relay normally imposing a substantially constant positive potential onto the control electrode of said second thyratron; a source of substantially constant negative potential and a circuit applying same to the control electrode of said second thyratron.

19. In an electric timing circuit for an electric welding machine the combination comprising: first and second bus conductors; a first thyratron and means including a switch connecting the cathode thereof to said first bus conductor; a first relay having first and second pairs of contacts and means including the winding thereof connecting the anode of said first thyratron to said second bus conductor, the first pair of contacts of said first relay adapted for controlling the opening and closing of welding electrodes; a second thyratron and means including the second pair of contacts of said first relay and said switch in series with respect to each other connecting the cathode thereof to said first bus conductor; a second relay having normally open first and normally closed second pairs of contacts and means including the winding thereof connecting the anode of said second thyratron to said second bus conductor; means including a first time constant circuit connecting the control electrode of said second thyratron to said first bus conductor; a third thyratron having its cathode connected to said first bus conductor; a load of relatively low resistance and the first pair of contacts of said second relay connecting the anode of said third thyratron to said second bus conductor; first and second resistors and means connecting same in series group; a first rectifier and means connecting said first rectifier and the second pair of contacts of said second relay in series and means connecting one end of said series group to said first bus conductor and means connecting the other end of said series group through said rectifier and said last-named contacts to said second bus conductor, said rectifier being so positioned that its negative side is connected to said second terminal; means connecting the control electrode of said thyratron to a point intermediate said second bus conductor and said resistors; first and second capacitors and means connecting each of them in shunt respectively around each of said resistors; a second rectifier and a resistance and means connecting same in a series group with each other and connecting one end of said series group to said second bus conductor and connecting the other end of said series group to a point between said first and second resistors, said second rectifier having its positive side connected to said second bus conductor.

20. In an electric timing circuit for controlling a sequence of operations, the combination comprising: first and second source terminals; a first thyratron and means including an electrically controllable switch connecting the cathode thereof to said first terminal; a relay having normally open first and normally closed second pairs of contacts and means including the winding thereof connecting the anode of said first thyratron with said second terminal; means including a first time constant circuit connecting the control electrode of said first thyratron to said first terminal; a second thyratron having its cathode connected to said first terminal; a load of relative low resistance and the first pair of contacts of said relay connecting the anode of said second thyratron to said second terminal; first and second resistors and means connecting same in series group; a first rectifier and means connecting said first rectifier and the second pair of contacts of said relay in series and means connecting one end of said series group to said first terminal and means connecting the other end of said series group through said first rectifier and said last named contacts to said second terminal, said rectifier being so positioned that its negative side is connected to said second terminal; means connecting the control electrode of said thyratron to a point intermediate said second terminal and said resistors; first and second capacitors and means connecting each of them in shunt respectively around each of said resistors; a second rectifier and a resistance and means connecting same in a series group with each other and connecting one end of said series group to said second terminal and connecting the other end of said series group to a point between said first and second resistors, said second rectifier having its positive side connected to said second terminal.

21. In an electric timing circuit for controlling a sequence of operations, the combination comprising: first and second terminals constituting a source of alternating potential; a first thyratron and means including a switch connecting the cathode thereof to said first terminal; a first normally opened pair of contacts and a second normally closed pair of contacts and means included in the anode circuit of said first thyratron for simultaneously reversing the conditions of both of said pairs of contacts and for connecting the anode of said thyratron to the second terminal; means including a time constant circuit connecting the control electrode of said thyratron to the first terminal; a second thyratron and means connecting the cathode thereof to said first terminal and means including a load of relatively low resistance and said first pair of contacts connecting the anode of said second thyratron to said second terminal; means including a time constant circuit and said second switch normally imposing a substantially constant positive potential on the control electrode of said second thyratron; a source of substantially constant negative potential and a circuit applying same to the control electrode of said second thyratron.

22. In an electric timing circuit for controlling a sequence of operations, the combination comprising: first and second terminals constituting a source of alternating potential; a first thyratron and means including a switch connecting the cathode thereof to said first terminal; a first normally opened switch and a second normally closed switch and means included in the anode circuit of said first thyratron for simultaneously reversing the positions of both of said switches and for connecting the anode of said thyratron to the second terminal; means including a first time constant circuit connecting the control electrode of said thyratron to the first terminal; a second thyratron and means connecting the cathode thereof to said first terminal and means including a load of relatively low resistance and said first switch connecting the anode of said second thyratron to said second terminal; means including a second time constant circuit and said second switch normally imposing a substantially constant positive potential on the control electrode of said second thyratron; a source of substantially constant negative potential and a circuit applying same to the control electrode of said second thyratron; a third thyratron and means including a third time constant circuit connecting the anode thereof to said first terminal and means including a fourth time constant circuit connecting the control electrode of the third thyratron to said second terminal, and means connecting the cathode of said third thyratron to the anode of said second thyratron; and means including a resistance of relatively great value connecting said last named cathode to said first terminal.

References Cited in the file of this patent

UNITED STATES PATENTS

| Number | Name | Date |
|---|---|---|
| 2,516,422 | Rockafellow | July 25, 1950 |
| 2,533,369 | Hartwig | Dec. 12, 1950 |
| 2,551,224 | Spierer | May 1, 1951 |
| 2,560,387 | Olving | July 10, 1951 |